United States Patent
Arnoux et al.

(10) Patent No.: US 12,040,746 B2
(45) Date of Patent: Jul. 16, 2024

(54) PHOTOVOLTAIC DEVICE TEST METHOD AND TEST APPARATUS

(71) Applicant: PASAN SA, Neuchâtel (CH)

(72) Inventors: Gilles Arnoux, Cheseaux-sur-Lausanne (CH); Nicolas Bassi, Hauterive (CH); Nicolas Frick, Neuchâtel (CH); Derk Bätzner, Ins (CH)

(73) Assignee: PASAN SA, Neuchâtel (CH)

( * ) Notice: Subject to any disclaimer, the term of this patent is extended or adjusted under 35 U.S.C. 154(b) by 0 days.

(21) Appl. No.: 18/548,307

(22) PCT Filed: Mar. 22, 2022

(86) PCT No.: PCT/EP2022/057453
§ 371 (c)(1),
(2) Date: Aug. 29, 2023

(87) PCT Pub. No.: WO2022/218656
PCT Pub. Date: Oct. 20, 2022

(65) Prior Publication Data
US 2024/0048099 A1 Feb. 8, 2024

(30) Foreign Application Priority Data

Apr. 16, 2021 (EP) .................................. 21168903

(51) Int. Cl.
*G01R 31/26* (2020.01)
*H02S 50/15* (2014.01)

(52) U.S. Cl.
CPC .................... *H02S 50/15* (2014.12)

(58) Field of Classification Search
CPC .. G01R 31/2605; G01R 31/40; G01R 31/025; G01R 31/405; G01R 31/024;
(Continued)

(56) References Cited

U.S. PATENT DOCUMENTS

| | | | |
|---|---|---|---|
| 2013/0278244 A1* | 10/2013 | Zhang | G01R 31/2607 324/130 |
| 2014/0140035 A1 | 5/2014 | Minami et al. | |

(Continued)

FOREIGN PATENT DOCUMENTS

| | | |
|---|---|---|
| EP | 2463672 A1 | 6/2012 |
| EP | 4075667 B1 | 8/2023 |

OTHER PUBLICATIONS

International Search Report for PCT/EP2022/057453 mailed Jun. 9, 2022, 3 pages.
(Continued)

*Primary Examiner* — Thang X Le
(74) *Attorney, Agent, or Firm* — NIXON & VANDERHYE

(57) ABSTRACT

Disclosed is a method for measuring and calculating a current-voltage curve and a current mismatch between junctions of a tandem solar cell, including at least two solar subcells, the method being performed under simulated solar irradiance according to the international standard illumination AM1.5. The method implies the illumination by a first broad-spectral band light source S1 and includes steps for calculating the necessary light intensities of narrow-band second and the third light sources. The steps of the method achieve to determine adapted gains for second and the third light sources, so that the combination of the light sources $S2_1$ and $S2_2$ provide the same test results of the solar cell as when illuminated with the first light source S1 only. Also disclosed is a solar cell test apparatus configured to realize the method of the invention.

20 Claims, 5 Drawing Sheets

(58) Field of Classification Search
CPC .. G01R 31/08; G01R 31/42; G01R 31/31721; G01R 19/165; G01R 19/16538; G01R 19/155; H02S 50/15
See application file for complete search history.

(56) References Cited

U.S. PATENT DOCUMENTS

| | | | |
|---|---|---|---|
| 2015/0061715 A1* | 3/2015 | Faifer | H01L 22/14 |
| | | | 324/754.23 |
| 2017/0141726 A1* | 5/2017 | Jungwirth | F21S 8/006 |
| 2018/0309404 A1* | 10/2018 | Hare | F21S 8/006 |
| 2021/0126580 A1* | 4/2021 | Moslehi | H01L 31/0504 |
| 2022/0311381 A1* | 9/2022 | Wang | H02S 50/10 |

OTHER PUBLICATIONS

Written Opinion of the ISA for PCT/EP2022/057453 mailed Jun. 9, 2022, 5 pages.

* cited by examiner

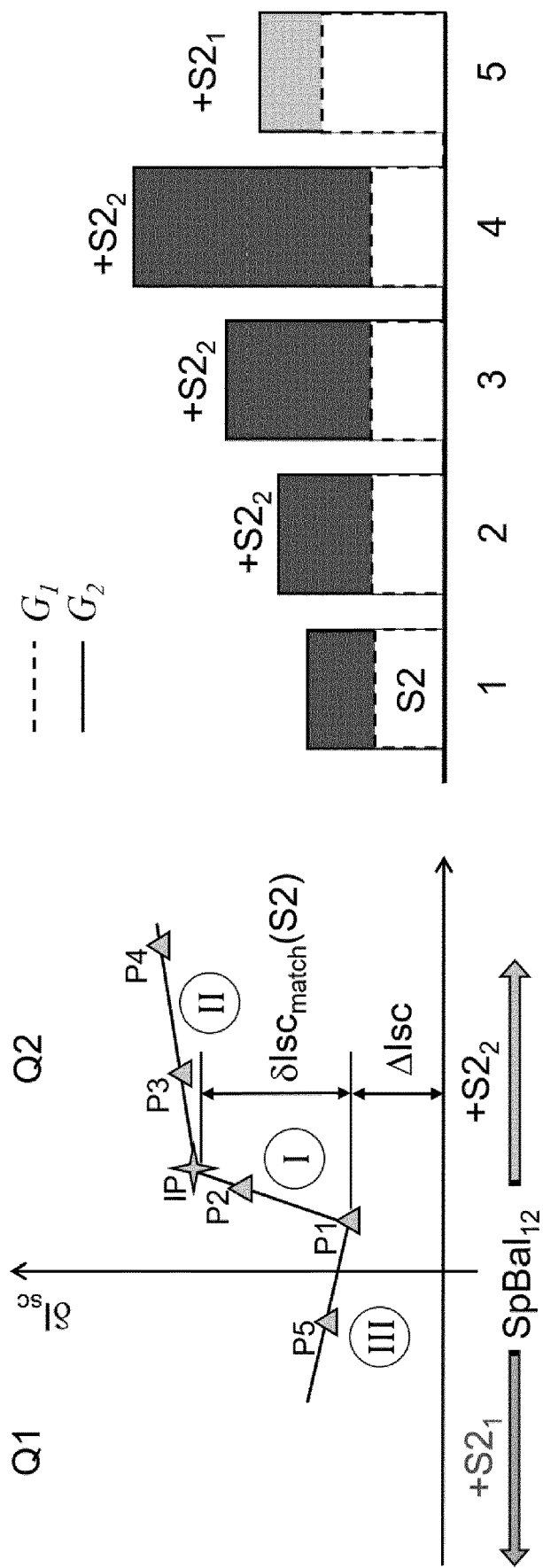

PHOTOVOLTAIC DEVICE TEST METHOD AND TEST APPARATUS

CROSS-REFERENCE TO RELATED APPLICATIONS

This application is the US national stage of PCT/EP2022/057453, filed Mar. 22, 2022 and designating the United States, which claims the priority of EP21168903.9, filed Apr. 16, 2021. The entire contents of each foregoing application are incorporated herein by reference.

TECHNICAL FIELD

The present invention relates to the field of photovoltaic devices. More particularly, it relates to a method to test multijunction photovoltaic cells and devices. The invention also relates to a test equipment to measure the opto-electrical characteristics of multi-junction photovoltaic devices under simulated sunlight.

A particular advantageous application of the present invention is to test at high speed and low-cost multijunction photovoltaic cells.

BACKGROUND OF THE INVENTION

The performance of solar cells is basically limited to inherent loss mechanisms that are present in any solar cell design. Typical losses are due to, for example, blackbody radiation, or recombination losses, both accounting for respectively 7% and 10% of the losses. But the dominant loss mechanism is the fact that it is impossible for a solar cell to extract all the radiated sun light onto a solar cell, including the fact that a solar cell cannot extract any power from certain photons that lack energy. Photons need to have enough energy to overcome the bandgap of the solar cell material.

If a photon has less energy than the bandgap of the solar cell material, it cannot be converted in an electron and hole. Conventional solar cells are for example not sensitive to most of the infrared spectrum, even if this represents a major potential energy fraction provided by the sun. On the other hand, photons that have a higher energy than the bandgap, for example blue light, eject electrons to a state that is higher than the bandgap. The extra energy is just lost because of collision processes that provide this lost energy as heat to a solar cell.

If one combines all the loss factors, a conventional silicon cell may have an efficiency that is typically lower than 30%. If one considers further losses, such as reflection losses or losses at charge collecting conductors, modern solar cells have an efficiency of about 23-26%.

Silicon is a good choice among other possible semiconductors because it provides a good balance between low and high bandgap materials, i.e. a bandgap of 1.1 eV corresponding to a wavelength of 1100 nm, i.e. the near infrared.

Therefore, multilayer solar cells have been proposed that are made of different materials and so different bandgaps. For example, a solar cell may have a first layer that is tuned to the red part of the spectrum and a second layer tuned to the green part of the spectrum. Similar to analysis made for single layer solar cells, it may be demonstrated that the ideal bandgaps for a two-gap device are 0.77 eV and 1.7 eV. Multilayer solar cells, also called multi-junction cells, are made by realizing a high bandgap layer for the shortest wavelengths to the side of the incident light. The next layers are successively lower bandgap layers. As the photons pass through the multilayer cell, transparent layers are needed to separate the layers. FIG. 1 illustrates the electrical diagram of a typical two-layer solar cell comprising a top cell and a bottom cell.

Conventional sun simulators primarily aim at measuring the current and voltage (IV) characteristics of single junction, terrestrial PV devices under sun-like illumination. A sun simulator consists of a stable light source that matches as closely as possible the sun light spectral characteristics and allows for the uniform illumination on a designated test area. During their production, PV devices are usually characterized using a pulsed sun simulator because they are less expensive, require low maintenance and consume less energy compared to continuous light sun simulators.

Multi-junctions PV devices have been developed primarily for space applications because they provide higher efficiency but at a much higher cost compared to single junction terrestrial PV devices. The characterization of multi-junction PV devices usually requires a set of reference, calibrated single junction cells that are representative of the respective absorbers of the multi-junction sub cells. They are used to calibrate the spectral irradiance of solar simulators. This approach, specific to space application, is costly and technically complex because it requires that the sun simulator has a tunable spectrum, which is a complex device to be designed. The approach also requires the establishment of reference component photovoltaic cells for the calibration of the spectrum calibration. An additional disadvantage is that such test methods and devices rely on the assumption that the reference component cells are representative of the properties of the multi-junctions PV devices under test.

Multi-junction PV devices for terrestrial application were so far mainly developed as thin film compounds. Nowadays, emerging technology such as tandem perovskite/silicon cells for example yield very promising efficiencies and promise production at low cost. Their characterization during industrial production must be performed at a reasonable cost and must be technically easy to implement. The characterization method requires a light source that is stable for a sufficiently long time, longer than the intrinsic stabilization time of the device under test, which typically cannot be achieved with a Xenon flash lamp but can with an LED based light source. The light source must have a spectrum that is close enough to the AM1.5, as defined in the international standard IEC 60904-3 and the measurement method must satisfy procedures defined in the international standard IEC 60904-1 and IEC 60904-1-1.

The international standard IEC 60904-3 is described in the following website: https://webstore.iec.ch/publication/64682. The international standard IEC60904-1-1 is described in the following website: https://webstore.iec.ch/publication/29335.

Therefor there is a need for characterization methods during industrial production of multi-junction PV cells that must be provided at a low cost and high speed, with an apparatus technically easy to implement.

SUMMARY OF THE INVENTION

The proposed test method and test apparatus of the invention solves the challenge of implementing a characterization method at reasonable cost with an apparatus and adjustment method that can characterize the IV curve of a multi-junction device. Additionally, it can extract the mismatch of its junction currents under illumination according to said international standard AM1.5, without using single junctions and/or calibrated reference cells or by measuring additionally the spectral response or quantum efficiency of the device. It takes advantage of the excellent spectral match of a pulsed, and filtered light source approaching the reference sunlight spectrum, according to the norm AM1.5, and combines it with at least two narrow bandwidth light sources that can deliver light intensities over a time period as required for stabilized measurement of the individual junctions. Such light sources can be realized for example by LED arrays. The pulsed light source is preferably a pulsed Xenon light source.

In a first aspect the invention is achieved by a method to test multi-junction solar cells, preferably double-junction solar cells. More precisely the method of the invention comprises the following steps.

In a second aspect the invention is achieved by a test apparatus configured to test multi-junction solar cells.

The method of measuring and calculating a current-voltage curve (IV) and a current mismatch between junctions of a tandem solar cell, comprising at least two solar subcells, is performed under simulated solar irradiance according to the illumination norm AM1.5, and comprises the steps (A-L) of:

A) providing at least one first light source for providing a light beam that has a spectrum corresponding to the norm AM1.5;

B) providing at least two narrow bandwidth light sources for providing at least two different light beams, each light beam being predominately absorbed by one of the at least two sub-cells;

C) illuminating the tandem solar cell with said first light source, for acquiring its short-circuit current Isc;

D) Illuminating the tandem solar cell with said first light source and at the same time adding additional light step intensities by one of said at least a second and a third light sources, for acquiring offset values of the change of short-circuit current relative to the acquired reference short-circuit current;

E) realizing a first interpolation curve using current data acquired at low additional light intensity steps during the illumination step D;

F) realizing a second interpolation curve using high additional light intensity steps during said illumination step D;

G) defining the intersection of said first and second interpolation curves, said intersection defining a balance ratio $Bal_{12}$ of the first and second junction short circuit current equal to 1;

H) calculating the short-circuit current of the tandem solar cell at said intersection;

I) determining the mismatch Bal12, ref of current between the junctions; from the parameter determined in Step H;

J) repeating Step D to I without illumination by said first light source and by using only said second and said third light sources;

K) Calculating the necessary light intensities of said second and said third light sources, to achieve an identical balance ratio and identical short circuit current by using adapted gains for the second and third light sources, so that the combination of said second and third light sources provide the same test results of the solar cell as when illuminated with said first light source only;

L) Using a light source that is the optical combination of said light sources second and third light sources, according to step K, to illuminate a solar cell to be tested and providing the current-voltage curve I-V of the tandem solar cell.

In an embodiment said first and said second interpolation is a linear interpolation.

In an embodiment more than 2 different narrow band light sources possibly at least 4, possibly at least 5, even more possibly at least 6 narrow band light sources.

In an embodiment first light source is an optically filtered Xenon flash lamp having a spectrum close to the AM 1.5 light spectrum.

In an embodiment said at least two narrow band width light sources comprise light emitting diodes or light emitting diode arrays, the emitted light of said second light source being predominately absorbed in a first junction and the emitted light of said third light source being predominately absorbed in a second junction of the tandem solar cell under test.

In an embodiment the absolute and relative light intensities of the light sources are measured and/or controlled by optically filtered PV monitor cells. The individual monitor cell being only sensitive to the spectrum of the light source to be monitored.

In an embodiment additional steps are performed that consist in calculating solar cell parameters chosen among: acquired IV curve as of short circuit current, the open circuit voltage, the fill factor, the series resistance and the parallel resistance or a combination of them.

In embodiments the time to characterize a tandem solar cell is performed in less than 1 min, preferably less than 10 seconds, more preferably less than 5 seconds, even less than 0.15 seconds.

The invention is also achieved by a solar cell test for characterizing a tandem solar cell comprising at least two sub-cells. The test apparatus is configured to realize the method as described. The test apparatus of the invention comprises at least one first light source for providing a light beam that has a spectrum corresponding to the international standard AM1.5 and wherein the test apparatus comprises further:

at least two narrow bandwidth light sources, for providing at least two different light beams, each light beam being predominately absorbed by one of the at least two sub-cells.

In an embodiment the solar cell test apparatus comprises more than 2 different narrow-band light sources, possibly at least 4, possibly at least 5, even more possibly at least 6 narrow-band light sources.

In an embodiment the first light source is a filtered Xenon flash lamp having a spectrum close to the AM 1.5 light spectrum.

In an embodiment at least one of said narrow band light sources is a light emitting diode (LED).

In an embodiment the solar cell test apparatus comprises at least one light intensity monitoring devices.

In an embodiment said light intensity monitoring device is a photovoltaic silicon diode.

In an embodiment said light intensity monitoring device comprises at least one optical band-pass filter.

BRIEF DESCRIPTION OF THE DRAWINGS

The present invention will now be described in reference to the enclosed drawings where:

FIG. 9 illustrates a resulting characteristic diagram under illumination of a light source that comprises the combination of a first and a second narrow-band light source, in the case of a tandem solar cell comprising two junctions;

FIG. 10 illustrates the light sequence that is used to generate the characteristic diagram of FIG. 9;

DETAILED DESCRIPTION

Figure 3:
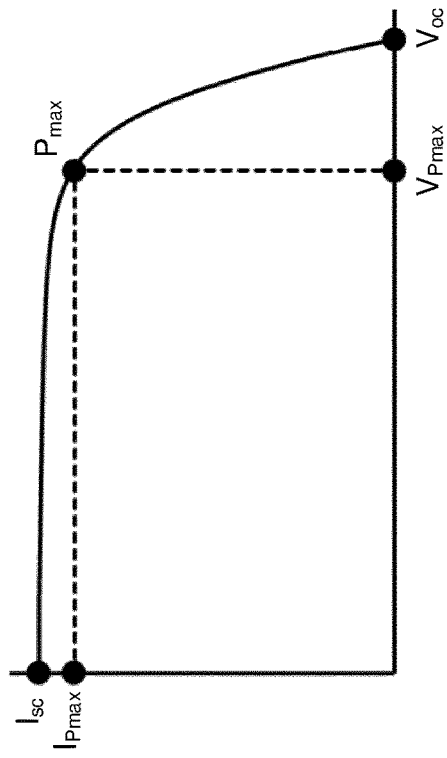
FIG. 3 illustrates a typical current-voltage characteristic (I-V curve) depicting typical I-V curve parameters such as the short-circuit current (Isc), the open-circuit voltage (Voc), the maximum-power (Pmax), the voltage at maximum-power (VPmax) and the electrical current at maximum-power (IPmax)

The present invention will be described with respect to particular embodiments and with reference to certain drawings, but the invention is not limited thereto. The drawings described are only schematic and are non-limiting. In the drawings, the size of some of the elements may be exaggerated and not drawn on scale for illustrative purposes. The dimensions and the relative dimensions do not correspond to actual reductions to the practice of the invention.

It is to be noticed that the term "comprising" in the description and the claims should not be interpreted as being restricted to the means listed thereafter, i.e. it does not exclude other elements.

Reference throughout the specification to "an embodiment" means that a feature, structure or characteristic described in relation with the embodiment is included in at least one embodiment of the invention. Thus, appearances of the wording "in an embodiment" or, "in a variant", in various places throughout the description are not necessarily all referring to the same embodiment, but several. Furthermore, the features, structures or characteristics may be combined in any suitable manner, as would be apparent to a skilled person from this disclosure, in one or more embodiments. Similarly, various features of the invention are sometimes grouped together in a single embodiment, figure or description, for the purpose of making the disclosure easier to read and improving the understanding of one or more of the various inventive aspects. Furthermore, while some embodiments described hereafter include some, but not other features included in other embodiments, combinations of features of different embodiments are meant to be within the scope of the invention, and from different embodiments. For example, any of the claimed embodiments can be used in any combination. It is also understood that the invention may be practiced without some of the numerous specific details set forth. In other instances, not all structures are shown in detail in order not to obscure an understanding of the description and/or the figures.

A horizontal plane herein is defined as an X-Y plane parallel to a face and the substrate of the tandem solar cell. The wording "vertical" means here perpendicular to the X-Y plane and defines a Z-axis. A radial direction means a direction defined in a horizontal cross section.

A tandem solar cell herein is also defined as a tandem device under test (DUT), or as "a solar cell" or "a tandem cell" or "a tandem PV device".

A top-cell in a tandem cell is defined as the cell to be directed to a light source. A bottom cell is the cell opposite to said top cell.

Herein a first light source is a light source that has a spectrum matching the one of the sun.

Second and third light sources are narrow band spectral sources.

The term "the light source" means a light source used during a step of the test method of the invention.

The term "optical combination of said light sources" herein means the superposition of said light sources so that they are used as an illumination source of a tandem solar cell to be tested.

The slope of a fitted curve is defined as the variation of a Y-axis relative to an X axis in an X-Y diagram. The X-axis is for example in FIG. 5 the axis of SpBal and the Y axis the axis of δ Isc.

The invention proposes a solar cell test apparatus 1 and a test and solar tandem cell 100 characterization method to solve the characterization problematic of tandem PV cells.

Test and Characterization Method of the Invention

The opto-electrical properties of the tandem device under test (DUT) that are systematically and automatically measured by the method and the test apparatus of the invention are:

I. the short circuit current of the multi-junction DUT with the short pulsed light source being closely adapted to the reference AM1.5 spectrum II. the mismatch of short circuit current between the two junctions of the device under test, Bal12=Isc1/Isc2 (as defined in IEC 60904-1-1), under simulated sunlight with spectral irradiance that closely matches the sun's reference spectrum (AM1.5). Isc1 and Isc2 are the short circuit currents of the top and bottom cell of the tandem solar cell 100 under test.

III. the full IV-characteristics and their derivatives such as, without limitation:
  Isc, the short circuit current;
  FF, the fill factor is a parameter which, in conjunction with Voc and Isc, determines the maximum power from a solar cell,
  Rsh, the shunt resistance
  Voc: open circuit voltage,
  Rse: series resistance).

The main properties of multi-junction photovoltaic devices are described now as a basis for the understanding of the invention.

Figure 1:
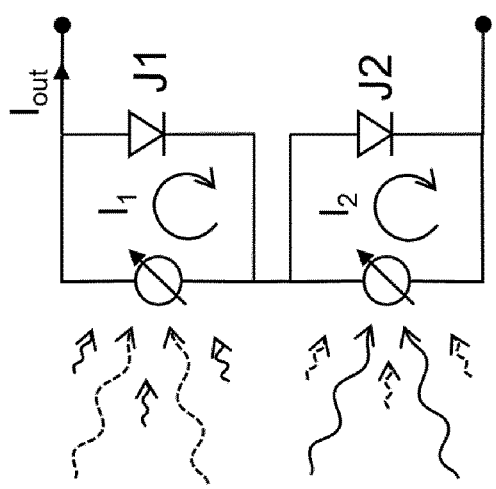
FIG. 1 illustrates an electrical diagram of a two-junction tandem photovoltaic device.

FIG. 1 illustrates an electrical diagram of a two-junction PV device which is commonly termed a tandem PV device. The electrical properties of such a tandem PV device are approximated with a model consisting of two single diodes circuits put in series.

Figure 2:
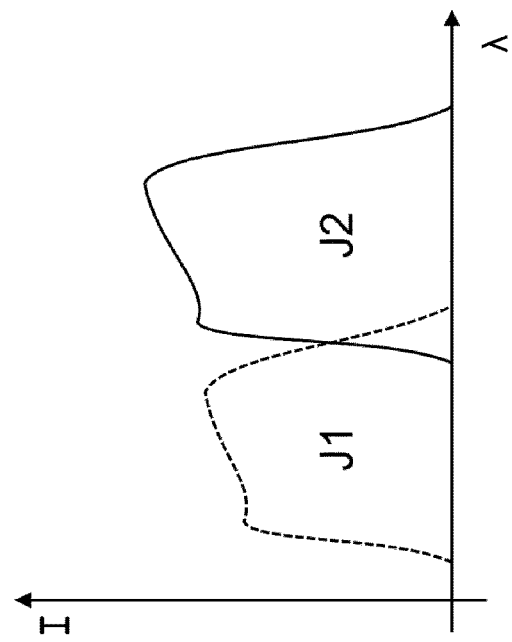
FIG. 2 shows the typical spectral response of a typical tandem cell having a first Junction J1 that is more sensitive to shorter wavelengths and a second junction J2 that is more sensitive to longer wavelengths.

FIG. 2 shows the typical spectral response of a typical tandem solar cell having a first Junction J1 that is more sensitive to shorter wavelengths and a second junction J2 that is more sensitive to longer wavelengths. The junctions J1, J2 act as current generator sources when they are exposed to a wide spectral illumination. As illustrated by the spectral responses, i.e. the electrical currents 11, 12, generated by units of spectral irradiance in FIG. 2, each junction J1, J2 absorbs a different part of the light spectrum of the incident light on the tandem solar cell.

Under natural sunlight or the standardized spectrum according to the international standard IEC 60904-3, one junction may generate more current than the other depending on the particular architecture of the tandem solar cell 100. This gives a mismatch in the current 11, 12 of the two junctions J1, J2. This mismatch is expressed by a ratio, which is defined in the international standard IEC 60904-1-1 as:

$$Bal_{ij} = \frac{I(J_i)}{I(J_j)}, i \neq j \quad (1)$$

The indices i and j represent the number of the junction (J1: i=1; J2: j=2)

When the two junctions J1, J2 are connected in series, i.e. as two terminal tandem cells, the total output current Iout (as represented in FIG. 1) is limited by the lowest current $I_{DUTout}$ of all junctions, defining the limiting junction, such that:

$$I_{DUTout} = \min_{(i,j)}\{I_i; I_j\}, i \neq j \quad (2)$$

In practice only the total output current Iout is measurable. The condition of formula 2 is true in particular when the device is connected in short circuit, providing a short circuit current, Isc, when the voltage measured at the terminals is zero, as illustrated in the IV characteristic of FIG. 3.

A source of the International standard IEC 60904-1 Ed.3 is found in for example the following website: https://webstore.iec.ch/publication/64682.

More precisely the method of the invention allows to measure and calculate a current-voltage curve (IV) and a current mismatch between junctions of a tandem solar cell, comprising at least two solar subcells.

The method is performed under simulated solar irradiance according to the international standard illumination AM1.5. The method is performed by a solar cell test apparatus 1 of the invention that is further described in more detail and that comprises:

- a pulsed light source S1 that closely matches the light of the sun and having a limited intensity variability and limited pulse duration (typically 5-20 ms);
- the same number N of narrow-band spectral sources S2i (i=1 . . . N) that have a spectrum to be absorbed predominantly by one of the junctions of the tandem solar cell 100 under test;
- electronic circuits comprising an active electronic load to measure the current and voltage of the tandem solar cell 100, while applying voltage waveforms to the solar cell under test;
- A power electronics with a drive control means for the intensity of any of the light sources.

In embodiments the apparatus comprises means to control the light intensity of each light source independently, for example by measuring the current of a monitor cell.

The test and characterisation method of the invention comprises the steps (A-L) of:
A) providing at least one first light source S1 for providing a light beam 10 that has a spectrum corresponding to the international standard AM1.5;
B) providing at least two narrow bandwidth light sources $S2_1$, $S2_2$, for providing at least two different light beams 12, 14, each light beam 12, 14 being predominately absorbed by one of the at least two sub-cells, N being at least 2;
C) illuminating the tandem solar cell 100 with said first light source S1, for acquiring its short-circuit current Isc;
D) illuminating the tandem solar cell 100 with said first light source S1 and at the same time adding additional light intensity increases, defined as intensity steps, to one of said at least a second and a third light source $S2_1$, $S2_2$, being narrow bandwidth light sources. This step D allows to acquire offset values of the change of short-circuit current δ Isc;
E) realizing a first interpolation curve using current data acquired at low additional light intensity steps during the illumination step D;
F) realizing a second interpolation curve using high additional light intensity steps during said illumination step D;
G) defining the intersection of said first and second interpolation curve, said intersection defining a balance ratio $Bal_{12}$ of the first and second junction short circuit current that is equal to 1;
H) calculating the short-circuit current $Isc_{match}$ of the tandem cell 100 at said intersection;
I) determining the mismatch Bal12, ref of current between the junctions from the parameter determined in Step H;
J) repeating Step D to I without illumination by said first light source S1 and by using only said second and said third narrow bandwidth light sources $S2_1$, $S2_2$,
K) calculating the necessary light intensities of said second and said third light sources $S2_1$, $S2_2$, to achieve an identical balance ratio, i.e. Bal12 (S2)=Bal12(S1), and also identical short circuit current, i.e. Isc(S2)=Isc (S1), by using adjusted level of intensity for second and third light sources $S2_1$ and $S2_2$, so that the results become the same as when illuminated with said first light source S1 only;
L) measuring the current-voltage curve I-V of the tandem solar cell 100 with accordingly adjusted illumination of combined light sources $S2_1$ and $S2_2$.

In an embodiment said first and/said second interpolation is a linear interpolation.

In an embodiment, more than 2 different narrow band light sources $S2_N$ are used, N possibly being at least 4, possibly at least 5, even more possibly at least 6.

In an embodiment the first light source S1 is a filtered Xenon flash lamp having a spectrum close to an AM 1.5 light spectrum.

In an embodiment said at least two narrow band width light sources $S2_1$ and $S2_2$ comprise light emitting diodes or light emitting diode arrays, the emitted light beam of said second light source $S2_1$ being predominately absorbed in a first junction J1 and the emitted light of said third light source $S2_2$ being predominately absorbed in a second junction J2 of the tandem solar cell 100 under test.

In an embodiment, the absolute and relative light intensities of the light sources S1, S2i (l=1 ... N) are measured and/or controlled by optically filtered PV monitor cells with selective spectral sensitivity, which cut-off wavelength is within 50% of that of the cell junctions spectral responses, possibly 20%, or even less than 10%.

In an embodiment, additional steps are performed that consist in calculating solar cell parameters chosen among: acquired IV curve as of Isc (short circuit current), Voc (open circuit voltage), FF (fill factor), Rs (series resistance) and Rp (parallel resistance) or a combination of them.

In an embodiment the time to characterize a tandem solar cell is performed in less than 5 min, preferably less than 1 min and even more preferably less than 10 seconds and possibly less than 0.15 seconds. Such a test speed is not possible to be reached with prior art test systems and certainly not with the required measurement precision as is achieved with the test system of the invention.

For reasons of completeness of understanding, the method of the invention is described now further in more detail. The method may be divided in three phases (phases I-III):

Phase I

A first phase I is based on the steps of:
  measuring the short circuit current: Iscref under reference illumination according to the norm IEC 60904-3;
  finding the mismatch of said current ratio Bal12 between the junction 1 and 2 currents, under reference illumination.

The first phase I of the test procedure is performed using the reference light source (S1 in FIG. 1), combined with at least two spectrally narrow light sources (S21, S22, in FIG. 1).

Figure 5:
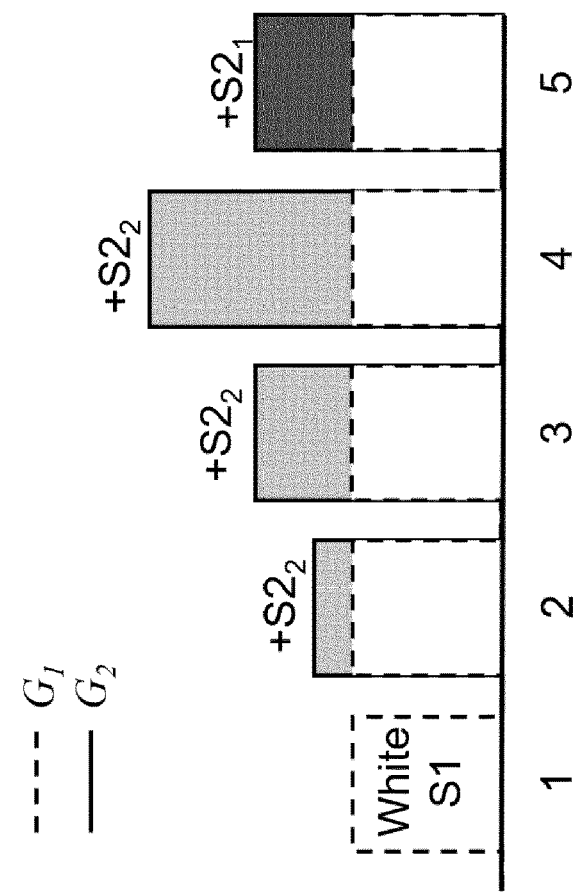
FIG. 5 illustrates a resulting characteristic diagram of a light sequence comprising intensity variation steps when a second of two junctions is limiting, and under illumination of a second light source that is a narrow spectral-band light source.

The measurement for the short circuit current Isc,ref is done by using only the first light source S1, such as a pulsed Xenon lamp. Then, the intensity of one of the narrow spectral band light source S21, S22 is changed step by step and the according short circuit current Isc of the tandem cell 100 is measured under those illuminations. This is illustrated in the example of FIG. 5 illustrating the value of δ Isc of measurement points 2, 3 and 4 by adding light from the third source S22 and at a measurement point 5 by adding light from the second source S21.

At each illumination step, the following quantities are evaluated:
1. The short circuit current Isc of the solar cell under test;
2. The light intensity or gain G1 of the second source $S2_1$;
3. The light intensity or gain G2 of the third source $S2_2$;

From these quantities, the following observables are determined:
  the spectral balance of a light source that comprises the second and third light sources $S2_1$ and $S2_2$ $$SpBal_{12} = \frac{G_2}{G_{2,ref}} - \frac{G_1}{G_{1,ref}} \quad (3)$$

the relative increase of short circuit current:

$$\delta Isc = \left(\frac{Isc}{Isc, ref} - 1\right) \quad (4)$$

Herein, Isc, ref is the reference short circuit current.

G1, ref and G2, ref are the reference irradiance, for example measured by filtered monitor cells MC1 and MC2 respectively.

The reference short-circuit Isc, ref here means that the short-circuit current Isc is measured under the light source S1 that closely matches the sun's spectrum. It does not refer to a calibrated reference with its traceability chain.

The parameters $SpBal_{12}$ and δIsc are defined during the first step of the sequence using the reference light source S1. So, by definition, SpBal12=0 and δIsc=0 when a measurement is performed with the unbiased S1 light source and they form the origin of the cell characteristics diagram in FIG. 5 with the data point 1.

By definition, S1 is the reference full spectrum source, such as a Xenon flash source, and is the closest match to the AM1.5 spectrum. The method aims at determining the mismatch of current between at least two junctions J1, J2 under an AM1.5 reference spectrum. This mismatch Bal12, ref is expressed as a ratio. When there is no mismatch, Bal12, ref is equal to 1.

In order to do so, since only the current of the limiting junction can be measured, the spectrum is biased until the matching ratio is reached, i.e. Bal12 is equal to 1. The combination of S1 biased with any additional amount of S2i imbalances the spectrum in the following steps of the sequence such that SpBal12 increases when the intensity of $S2_2$ increases and SpBal12 decreases when the intensity of $S2_1$ increases. SpBal12 is the x-coordinate of the diagrams in the examples of the diagrams of FIGS. 5, 7, 9.

For reasons of clarity the significance of the variable ratio Bal12 is now further described in more detail Bal12 is defined by formula (1) and has no dimension since it is a ratio of two currents (i.e. the one of the top- and bottom-cells of the tandem solar cell).

If the top- and bottom-cell are matched, i.e. providing the same current, then Bal12=1. This is only the case under a certain illumination condition and so by a certain composition of the intensities of the second and third lights sources S21 and S22.

The illumination by the second and third light sources S21, S22 is to be adjusted to find the illumination condition which is a matching point defined by Bal12=1.

The change in the illumination, different from the reference spectrum AM1.5, which is necessary to find Bal12=1 gives the information about the current mismatch of the cell's junctions under reference illumination. Reference illumination herein is the illumination as defined in the international standard IEC 60904-3, and it is close to the spectrum of the sun at 43° azimuth angle under certain environmental conditions, like air humidity and ground albedo.

The method of the invention allows finding the right "light mixture" under narrow band illumination sources, typically two LED arrays, in order to obtain the same generated carrier density in each junction as with said first lamp S1, typically a flashed Xenon lamp, which is well adapted to the AM1.5 spectrum. And the same output current of the solar cell under illumination of the second light source S21 as under Illumination of the first light source S1 is desired.

So, the method steps allow to find the situation wherein: Bal12 (S2)=Bal12 (S1), where S2=S2$_1$+S2$_2$, which represents the optimized mixture of the said second and third narrow band sources S2$_1$, S2$_2$, such as two LEDs, as obtained by the test method.

Preferably S2$_1$, S2$_2$ are two LEDs (or two LED arrays) and S1 is preferably a Xenon flash-light source, but other light sources may be used.

The overall current of the tandem solar cell 100 under test should be identical under both illuminations, i.e. under a mix of second and third light sources or under said first light source i.e. I(S2)=I(S1), I being a junction current.

It is understood that the same test method may be adapted to more than 2 narrow-band light sources and tandem cells that comprise more than 2 junctions J1, J2.

As a byproduct of the test procedure the matching point Bal12=1 of the device under test is found. Otherwise said, it is possible to find the deviation of the overall current at the matching point from the point found with reference illumination, which is defined as a δ Is$_{match}$ herein.

Figure 6:
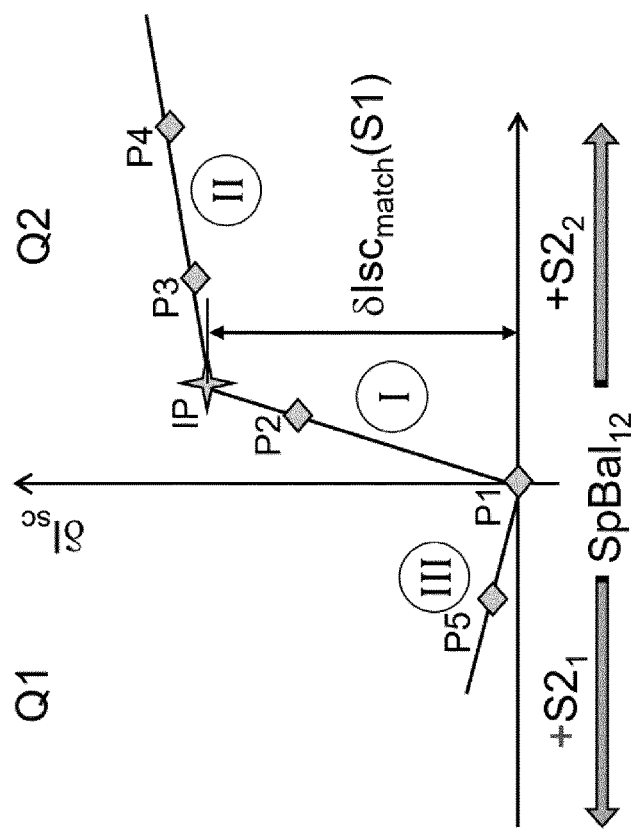
FIG. 6 illustrates the light sequence that is used to generate the characteristic diagram of FIG. 5.
Figure 8:
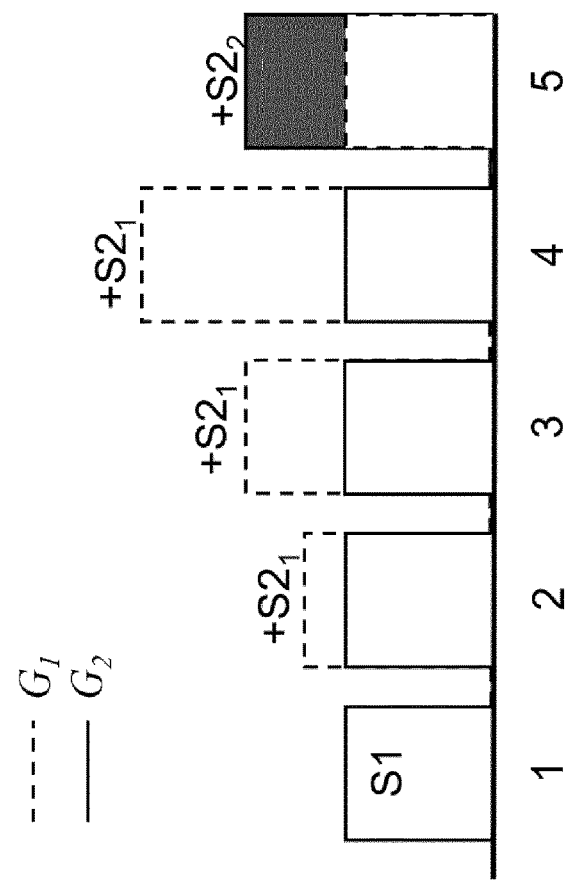
FIG. 8 illustrates the light sequence that is used to generate the characteristic diagram of FIG. 7.

In cases wherein the individual currents of the junctions of the solar cell 100 are not matched (i.e. Bal12≠1) at the reference spectrum, the additional narrow-band light source S2i, used to measure the stepwise increase of the current of the solar cell, is chosen such that it adds additional illumination to the current limiting junction. By this additional illumination the measured current of the tandem solar cell increases. The increase rate depends on the limiting junction's spectral response and the spectral irradiance of the sources S2i. If the source S2i illuminates the junction that is limiting, then the value of δ Isc increases with a change in SpBal$_{12}$ and can be approximated by the linear function I as illustrated for the examples in FIG. 5 wherein junction J2 is limiting and FIG. 7 wherein the other junction J1 is limiting. Beyond the current matching point of the 2 sub cells, the spectral imbalance with respect to the reference spectrum is such that the limiting junction changes. This leads to an abrupt change of the rate of current increase, which can be approximated by a second linear function, i.e. linear fit II in the examples of FIGS. 5 and 7. FIGS. 6 and 8 show schematically the changes of intensities by applying intensity steps to the used second source S1.

In variants, the fitted curves may be non-linear curves.

In cases where the additional illumination is such that it is absorbed by one of the junctions only and there are no shunts in the limiting junction, the rate of current increase is zero.

Figure 7:
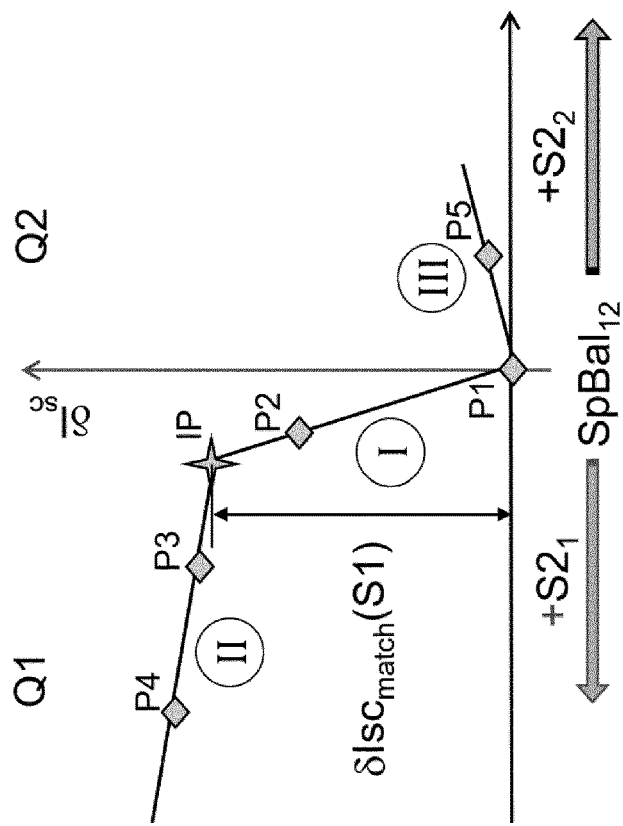
FIG. 7 illustrates a resulting characteristic diagram when a first of two junctions is limiting and under illumination of a second light source that is a narrow spectral-band light source, in the case of a tandem solar cell comprising two junctions.

The intersection point IP between the fitted curves I and II (represented by star cross) in FIGS. 5 and 7 determines the point wherein the currents in the two junctions match and this is represented by the value δ Iscmatch (S1).

If one of the light sources S2i is emitting a spectrum that is absorbed by both of the junctions of the solar cell under test, it is defined as a crosstalk of the light source. The crosstalk has to be limited such that a further increase of the light intensity beyond the matching point gives a distinguishable slope in the two linear approximations I, II. This is achieved by carefully choosing the light source with respect to the spectral response of the junctions. It is also required that the limiting junction does have a sufficiently high shunt resistance. The method might fail if one of the junctions has a low shunt resistance. Such devices can be effectively sorted out and diagnosed as defective.

If the crosstalk of the light source illuminating the limiting junction is zero, then Bal12, ref can be derived from δ Isc$_{match}$ (S1), such that $$Bal_{12,ref}=(1+\delta Isc_{match})^{(-1)^{Jlim}} \quad (5)$$

Jlim is the index of the limiting junction. For example, Jlim=1 for the top cell and Jlim=2 for the bottom cell.

Since δIsc$_{match}$≥0, Bal12≥1 if Junction J2 is limiting (Jlim=2) (FIG. 5) and Bal12≤1 if Junction J1 is limiting (Jlim=1) (FIG. 7). If the crosstalk is not equal to zero on the limiting junction (slope of fitted curve II), then the equality of equation (5) becomes an approximation only as long as the crosstalk is small, which is a required condition of the apparatus for the method to work.

For a full characterization, a linear fit Ill can be optionally determined once the fitted curves I and II are obtained and thus the limiting junction identified. It is obtained by varying the SpBal12 in the other direction. If the slope of fitted curve Ill is not equal to zero, then it means that junction j is sensitive to the light source S2i (i.e. cross talk due to light source design imperfections) or the limiting junction shows a shunting behavior. This information is used to determine the correct balance of the tested solar cell.

It has to be emphasized that all described necessary measurements of Phase I can be done advantageously during a single short pulse of light source S1. More precisely said, within the duration of the light pulse of S1 the electrical current can be measured by using a combination of S1+S21 or S1+S22.

Phase II

The goal of the second phase II of the test method is to determine the set points of narrow-band light sources S2i for a spectrally balanced and intensity calibrated combined light source S2 that is composed of the superposition of only the spectrally narrow second and third light sources S21 and S22, without using the first light source S1.

In case of proper settings, the same current balance Bal12, ref of the individual junctions and the same overall short circuit current of the tandem solar cell as measured with the pulsed light source S1 is established.

The first Isc measurement of phase II is obtained using the best guess light intensity set points for the combination of secondary light sources S21+S22. This yields the first point in the characteristic diagram illustrated in FIG. 9. FIG. 10 illustrates the light sequence steps.

The relative difference of the extracted Isc, compared to the reference Isc,ref obtained under S1 illumination (FIGS. 5, 7) δ Isc, depends on the best guess light intensity set points.

Phase II contains a step by step increase of one of the two narrow-band sources S2$_1$ or S2$_2$ and the extraction of the corresponding Isc values so that the solar cell characteristic diagram under illumination of S2 (i.e. the combination of simultaneous illumination by S2$_1$ and S2$_2$ is obtained.

From the diagram in FIG. 9, the following quantities are derived:

$$\Delta Isc_{match}=\delta Isc_{match}(S1)-\delta Isc_{match}(S2) \quad (6)$$

$$\Delta Isc=\delta Isc_1(S2) \quad (7)$$

The index 1 of δIsc$_1$(S2) in equation (6) refers to the first Isc measurement of Phase II.

The aim of the characterization is to determine the two light intensity set points satisfying the two conditions:

$$\Delta Isc=0 \quad (8)$$

$$\Delta Isc_{match}=0 \quad (9)$$

When these conditions are met, then this means that the current mismatch Bal12, ref is obtained with the light sources $S2_1$ and $S2_2$ at the measurement point P1 in the diagram of FIG. 9, and that the bi-chromatic light source is considered as spectrally balanced. The detailed methodology for meeting this target depends very much on the apparatus used (light sources and means of control). The condition expressed in equation (8) and (9) can be met with the settings evaluated in phase II when the sources ($S2_1$ and $S2_2$) are adjusted as already mentioned above to yield the same Isc as with source S1 and more importantly with the same carrier injection in each junction. This condition can be represented and constructed in a graphical way using the characterization diagram as in FIG. 5 and FIG. 9.

Figure 12:
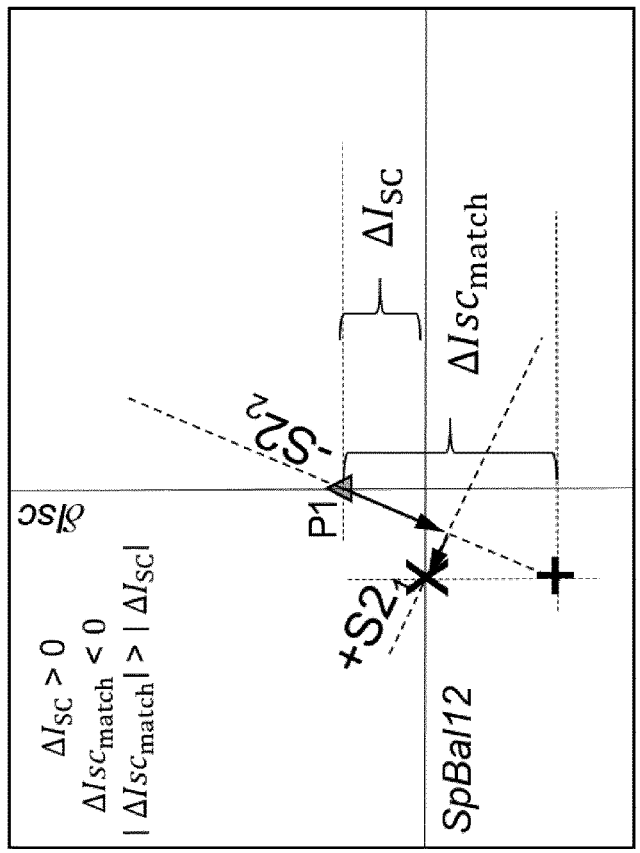
FIG. 12 illustrates another example of a graphical representation of how two spectrally narrow sources must be adjusted so that the combination of at least two narrow-band light source yield the same amount of photo-current in either of the junctions of the solar cell as when illuminated with a broadband light source only.
Figure 11:
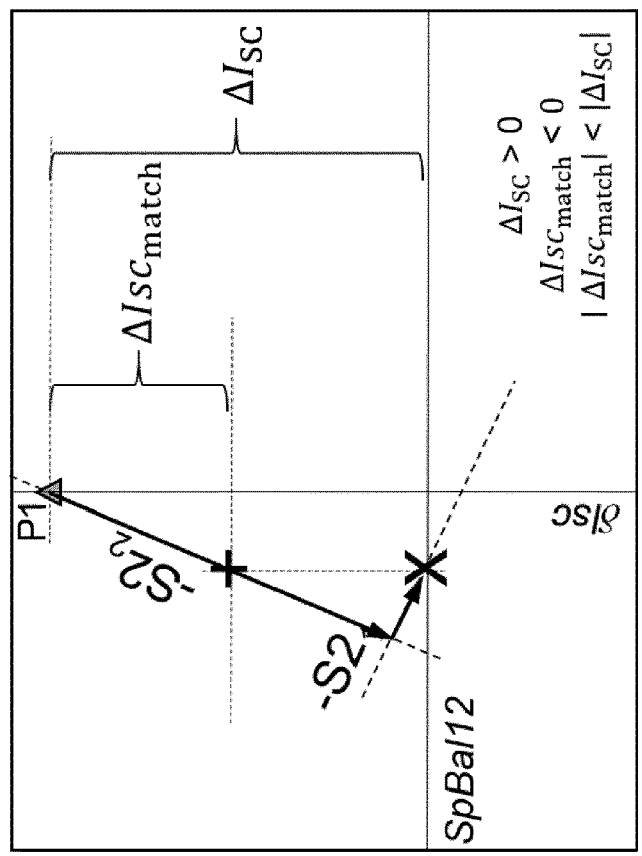
FIG. 11 illustrates an example of a graphical representation of how two spectrally narrow sources must be adjusted, so that the combination of at least two narrow-band light sources provide the same test results of the solar cell as when illuminated with a broadband light source only.

Two different examples for a graphical representation of the correct settings are given in FIGS. 11 and 12. Both examples are parting from point P1 the initial characterization point of phase II represented in the diagram on the y-axis. The y-intersect is by definition ΔIsc. The condition ΔIsc=0 is fulfilled for the entire x-axis. In FIGS. 11 and 12 the correct spectral balance for the solar cell under test is marked with an X-cross on the x-axis, in fact any point in diagram with the same y-value as the y-value for the X-cross fulfill condition of equation (9), i.e. $\Delta Isc_{match}$=0. This means that the injections of the two junctions have the same ratio as under illumination with source S1. Graphically this condition is found by constructing the point on the linear function (I) through point P1 with the distance of the ordinate component of $\Delta Isc_{match}$, represented by the +− cross (IP) in FIGS. 11 and 12.

From the +− cross point (IP) the linearization of the measured cell 100 characterization fulfills the relation $\delta Isc_{match}(S1)=\delta Isc_{match}(S2)$ and hence condition of equation (9). The projection of the +− cross (IP2) onto the x-axis, i.e. the X-cross (IP1) is the graphical representation of the adjustment of the intensities of both bi-chromatic sources $S2_1$ and $S2_2$ for the same injection into each junction as with the full spectrum S1 source especially with the conservation of the injection balance ratio constant.

Graphically the path from the initial measurement point P1 of phase II to the X-cross (IP1) can be decomposed into the individual changes of each component of the bi-chromatic sources $S2_1$ and $S2_2$ represented by the two vectors in FIGS. 10 and 12 labelled with $S2_2$ and $S2_1$, respectively and displayed by arrows. Each vector represents the shift of cell characteristic in the diagram by the separate adjustment of only one of the accordingly labelled bi-chromatic sources.

The two examples given in FIGS. 11 and 12 both represent the case of a bottom limited tandem cell 100.

FIGS. 11 and 12 illustrate examples of the graphical construction of how the spectrally narrow sources must be adjusted in order to meet condition in equation (8) and (9). The triangle point (P1) indicates the first measurement of phase II of the sequence.

In both cases illustrated in FIGS. 11 and 12 the initially measured Isc is too high (ΔIsc>0). The necessary adjustment of the bi-chromatic source has to be made in such a way that ratio of injection is shifted towards the top-cell ($\Delta Isc_{match}$>0), which is equivalent with the position of the X-cross (IP1) to be on the left (negative direction) on SpBal12. In FIG. 11 both sources need to be decreased in intensity to achieve this because ($|\Delta Isc_{match}|<|\Delta Isc|$) The decrease is indicated by the two arrows in FIG. 11 pointing downward.

So, in the case of FIG. 11: $\Delta I_{SC}>0$ and $|\Delta Isc_{match}|<\Delta I_{SC}$. $\Delta Isc_{match}<0$ is a consequence and not a requirement in this case. It is to be noted that in the case of FIG. 11, LED2 must be stronger reduced than LED1.

The example case illustrated in FIG. 12 would yield a too low current after the decrease of the intensity in the third source $S2_2$ (($|\Delta Isc_{match}|>|\Delta Isc|$) thus requiring to adjust the current of the solar cell under test by an increase (indicated by the short arrow pointing upward) of the intensity of the second source $S2_1$.

So, in the case of FIG. 12: $|\Delta Bal_{12}|<|\Delta Isc|$ and $\Delta Bal_{12}<0$ is a consequence and ΔIsc can be positive or negative.

The information of the intensity adjustment for each individual source $S2_1$ and $S2_2$ is contained in the length of the base vectors and the calibration function for the source intensity, which is an integral part of the characterization apparatus.

It has to be emphasized that, generally, the initial measurement point P1 for phase II might not be positioned at SpBal12=0, as illustrated in FIG. 9 depending on monitor values G1, ref and G2, ref obtained. Since the adjustments are relative to said initial point P1 they are not affected by the absolute x-value and thus can be translated into a more intuitive representation as chosen in FIGS. 11 and 12 with the initial point P1 translated onto the y-axis. In other words, a translation of the diagram by a constant x-value will not affect the resulting vectors that represent the adjustments of the narrow-spectral band S2 sources S2.

Phase III of the Measurement Sequence

Phase III of the measurement sequence is the full-IV characterization using the spectrally adjusted light sources S2 (i.e. the combination of $S2_1$ and $S2_2$), with the determined gains of light sources $S2_1$ and $S2_2$ that guarantees the same short circuit current Isc and the same current mismatch Bal12 as with light source S1, i.e. Bal12(S2)=Bal12(S1).

Solar Cell Test Apparatus 1 of the Invention

The invention is also achieved by a test apparatus 1, defined also as solar simulator, to measure and characterize a tandem solar cell 100 according to the test method of the invention as described herein.

The test apparatus allows performing all the steps of the test and characterization method of the invention as described herein The test apparatus of the invention is preferably composed of:
- one short (5-20 ms) pulsed light source S1 that closely matches the reference spectrum AM1.5 (typically a filtered Xenon light source), which has a limited variability in terms of intensity (1sun±20%) and pulse duration (typ. 5-20 ms);
- as many narrow-spectral band light sources as there are junctions that can be individually controlled. Those light sources are emitting a spectrum that can excite predominately one of the junctions of the tandem solar cell under test, for example LED based light sources with central wavelengths that coincide with the spectral response of each single junction. Each source has a large operational variability in terms of intensity (typically it can generate the same electrical current as obtained with an illumination of 2 suns in the according junction of the tandem device) and duration (typically up to 1 s) in order to accommodate requirements of some PV technologies.

Additionally, for ease of use but not mandatory, the test apparatus 1 can be equipped with light intensity monitoring devices. These devices can be also wavelength selective, for example selective to one of the narrow band light sources.

Typically, those monitor cells are made of photovoltaic silicon diodes equipped with optical band-pass filters. Monitor cells have to be placed preferably at the same level as the device under test and within the uniform illumination area. But this is not mandatory, just suitable for high accuracy of monitoring. They at least must be representative of the light intensity incident onto the DUT.

The test apparatus comprises preferably also:

an active electronic load that can measure the current and voltage of the DUT, and if applicable, the current of each monitor cells, while applying any required temporally imposed voltage-waveform to that same DUT.

Figure 4:
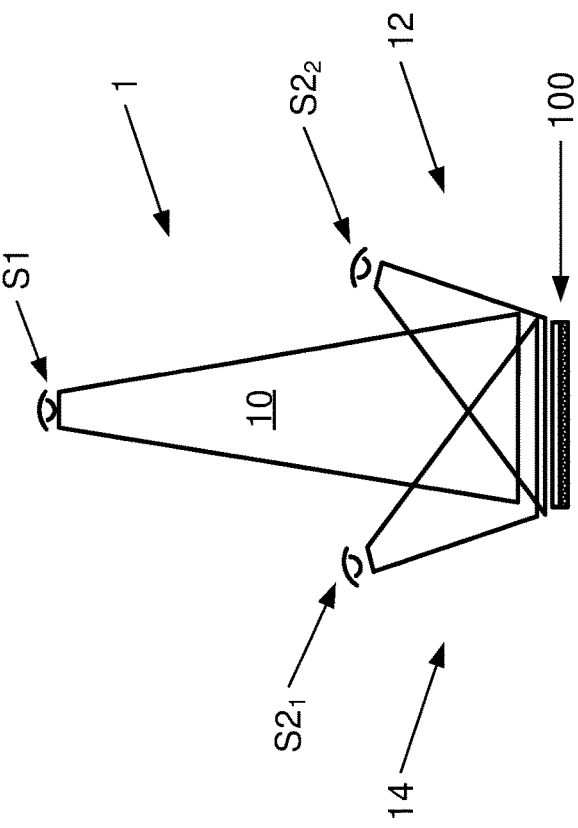
FIG. 4 illustrates an optical arrangement of the test apparatus of the invention comprising a first broadband lamp and two narrow spectral band light sources that are arranged to illuminate uniformly a tandem solar cell to be tested.

FIG. 1 shows the principle of the optical arrangement of the test apparatus used for the measurement with the various type of light sources, the multi-junction device under test and the monitor cells. The first light source S1 is configured to emit and direct a light beam that is incident to the entire tandem solar cell to be tested. At least two narrow-band light sources, such as LED's, S21 and S22 are configured to provide light beams 12, 14 light beam that is incident to the entire tandem solar cell to be tested. As illustrated in FIG. 4, each light beam 10, 12, 14 must cover completely the solar cell under test.

The test apparatus 1 of the invention allows in particular for the determination of the short-circuit current, Isc, of the solar cell 100 under test, which corresponds to the smallest current of the two junctions J1, J2. For each combination of light sources S1, S21, S22 of the apparatus, an Isc can be determined and the individual light source intensities are determined by either their means of control or independent means of measurement.

In variants of the method and the test apparatus, means may be provided to implement to used pulsed light sources, having a chosen pulse frequency so that the precision and/or the speed of the measurements may be improved.

The invention claimed is:

1. A method of measuring and calculating a current-voltage curve (IV) and a current mismatch between junctions of a tandem solar cell (100), comprising at least two solar subcells, the method being performed under simulated solar irradiance according to the illumination norm AM1.5, as defined in the international standard IEC 60904-3, and comprising the steps (A-L) of:
   A) providing at least one first light source (S1) for providing a light beam (10) that has a spectrum corresponding to the international standard AM 1.5, as defined in the international standard IEC 60904-3;
   B) providing at least two narrow bandwidth light sources ($S2_1$, $S2_2$), for providing at least two different light beams (12, 14), each light beam (12, 14) being predominately absorbed by one of the at least two subcells;
   C) illuminating the tandem solar cell (100) with said first light source (S1) for acquiring its short-circuit current (Isc);
   D) illuminating the tandem solar cell with said first light source (S1) and at the same time adding additional light step intensities by one of said at least two narrow bandwidth light sources ($S2_1$, $S2_2$), for acquiring offset values of a change of short-circuit current (δIsc) relative to the short-circuit current (Isc) acquired in step C);
   E) realizing a first interpolation curve (I) using current data acquired at low additional light intensity steps during the illumination step D;
   F) realizing a second interpolation curve (II) using high additional light intensity steps during said illumination step D;
   G) defining an intersection (IP) of said first and second interpolation curves (I, II), said intersection (IP) defining a balance ratio $Bal_{12}$ of first and second junction short circuit currents equal to 1;
   H) calculating a short-circuit current Iscmatch of the tandem solar cell (100) at said intersection;
   I) determining a mismatch junction (Bal12, ref) of current from the short-circuit current Iscmatch calculated in Step H;
   J) repeating Steps D to I without illumination by said first light source and by using only said at least two narrow bandwidth light sources ($S2_1$, $S2_2$);
   K) calculating necessary light intensities of said at least two narrow bandwidth light sources ($S2_1$, $S2_2$), to achieve an identical balance ratio Bal12 (S2)=Bal12 (S1) and identical short circuit current Isc(S2)=Isc(S1) by using adapted gains for said at least two narrow bandwidth light sources ($S2_1$, $S2_2$), so that a combination (S2) of said at least two narrow bandwidth light sources ($S2_1$, $S2_2$) provide the same test results of the tandem solar cell (100) as when illuminated with said first light source (S1) only;
   L) using a light source that is an optical combination (S2) of said at least two narrow bandwidth light sources ($S2_1$, $S2_2$) according to step K, to illuminate the tandem solar cell (100) to be tested and providing the current-voltage curve I-V of the tandem solar cell (100).

2. The method according to claim 1, wherein said first and second interpolation curves are linear interpolations.

3. The method according to claim 1, wherein more than two different narrow band light sources ($S2_N$) are used, N possibly being at least 4, possibly at least 5, even more possibly at least 6.

4. The method according to claim 1, wherein the first light source (S1) is an optically filtered Xenon flash lamp having a spectrum close to an AM 1.5 light spectrum, as defined in the international standard IEC 60904-3.

5. The method according to claim 1, wherein said at least two narrow band width light sources ($S2_1$, $S2_2$) comprise light emitting diodes or light emitting diode arrays, the emitted light of said second narrow band width light source ($S2_1$) being predominately absorbed in a first junction J1 and the emitted light of said third narrow band width light source ($S2_2$) being predominately absorbed in a second junction (J2) of the tandem solar cell being tested.

6. The method according to claim 1, wherein absolute and relative light intensities of the light source and the at least two narrow band width light sources (S1, S2i) are measured and/or controlled by optically filtered PV monitor cells that are only sensitive to the spectrum of the light source to be monitored.

7. The method according to claim 1, wherein additional steps are performed that comprise calculating solar cell parameters chosen among: acquired IV curve as of the short circuit current (Isc), open circuit voltage (Voc), fill factor (FF), series resistance (Rs), parallel resistance (Rp) and combinations thereof.

8. The method according to claim 1, wherein the time to characterize the tandem solar cell (100) is performed in less than 1 min.

9. A solar cell test apparatus (1) for carrying out the method of claim 1, comprising a tandem solar cell (100) comprising at least two sub-cells, the apparatus (1) comprising at least one first light source (S1) for providing a light beam (10) that has a spectrum corresponding to the international standard AM1.5 and wherein the test apparatus (1) comprises further at least two narrow bandwidth light sources (S2$_1$, S2$_2$), for providing at least two different light beams (12, 14), each light beam (12, 14) being predominately absorbed by one of the at least two sub-cells.

10. The solar cell test apparatus (1) according to claim 9 comprising more than two different narrow band light sources S2$_N$, N possibly being at least 4, possibly at least 5, even more possibly at least 6.

11. The solar cell test apparatus (1) according to claim 9, wherein the first light source (S1) is a filtered Xenon flash lamp having a spectrum close to an AM 1.5 light spectrum, as defined in the international standard IEC 60904-3.

12. The solar cell test apparatus (1) according to claim 9, wherein at least one of said at least two narrow band light sources is a light emitting diode (LED).

13. The solar cell test apparatus (1) according to claim 9, comprising at least one light intensity monitoring device.

14. The solar cell test apparatus (1) according to claim 13, wherein said light intensity monitoring device is a photovoltaic silicon diode.

15. The solar cell test apparatus (1) according to claim 14, wherein said light intensity monitoring device comprises at least one optical band-pass filter.

16. The method according to claim 2, wherein the first light source is an optically filtered Xenon flash lamp having a spectrum close to an AM 1.5 light spectrum, as defined in the international standard IEC 60904-3.

17. The method according to claim 3, wherein the first light source is an optically filtered Xenon flash lamp having a spectrum close to an AM 1.5 light spectrum, as defined in the international standard IEC 60904-3.

18. The method according to claim 2, wherein said at least two narrow band width light sources comprise light emitting diodes or light emitting diode arrays, the emitted light of said second light source being predominately absorbed in a first junction J1 and the emitted light of said third light source being predominately absorbed in a second junction of the tandem solar cell being tested.

19. The method according to claim 3, wherein said at least two narrow band width light sources comprise light emitting diodes or light emitting diode arrays, the emitted light of said second light source being predominately absorbed in a first junction J1 and the emitted light of said third light source being predominately absorbed in a second junction of the tandem solar cell being tested.

20. The method according to claim 4, wherein said at least two narrow band width light sources comprise light emitting diodes or light emitting diode arrays, the emitted light of said second light source being predominately absorbed in a first junction J1 and the emitted light of said third light source being predominately absorbed in a second junction of the tandem solar cell being tested.

* * * * *